United States Patent [19]

Tomita et al.

[11] Patent Number: 4,921,687

[45] Date of Patent: May 1, 1990

[54] METHOD OF MAKING HIGH-ORIENTATION SHEET-LIKE GRAPHITE BY USING LAMINAR COMPOUND

[75] Inventors: Akira Tomita, Sendai; Takashi Kyotani, Izumi; Naohiro Sonobe, Sendai, all of Japan

[73] Assignee: Tohoku University, Sendai, Japan

[21] Appl. No.: 224,331

[22] Filed: Jul. 26, 1988

[30] Foreign Application Priority Data

Nov. 28, 1987 [JP] Japan .............................. 62-298901

[51] Int. Cl.$^5$ .............................................. C01B 31/04
[52] U.S. Cl. ................................... 423/448; 423/445; 423/449
[58] Field of Search ...................... 423/445, 448, 449

[56] References Cited

U.S. PATENT DOCUMENTS 3,348,917 10/1967 Nester .................................. 423/448
3,922,383 11/1975 Wilks et al. .......................... 423/448
3,927,187 12/1975 Luhleich et al. ..................... 423/448
3,932,596 1/1976 Rohatgi ............................... 423/448
4,263,268 4/1981 Knox et al. .......................... 423/448
4,627,944 12/1986 Musakami et al. .................. 423/449
4,652,436 3/1987 Kato .................................... 423/439
4,806,290 2/1989 Hopper et al. ...................... 423/445

FOREIGN PATENT DOCUMENTS 50-72892 6/1975 Japan .................................. 423/449

Primary Examiner—Robert L. Stoll
Assistant Examiner—Robert M. Kunemund
Attorney, Agent, or Firm—Fleit, Jacobson, Cohn, Price, Holman & Stern

[57] ABSTRACT

A method making high-orientation sheet-like graphite by inserting monomer of high molecular compound between layers of laminar compound such as montmorillonite, polymerizing the monomer, preliminarily carbonizing the thus formed polymer, removing the laminar compound by acid treatment, and effecting graphitization at a high temperature.

8 Claims, 3 Drawing Sheets

FIG_1A IPC
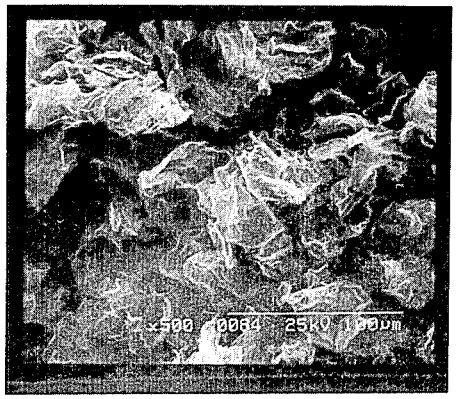
FIG_1B FPC
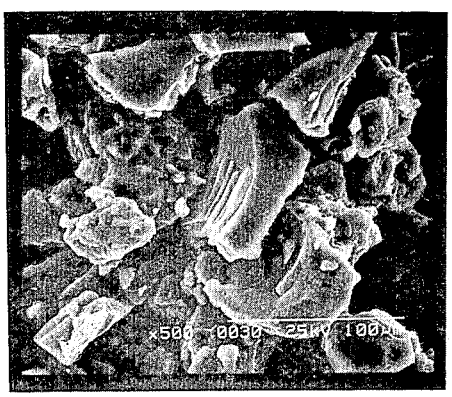

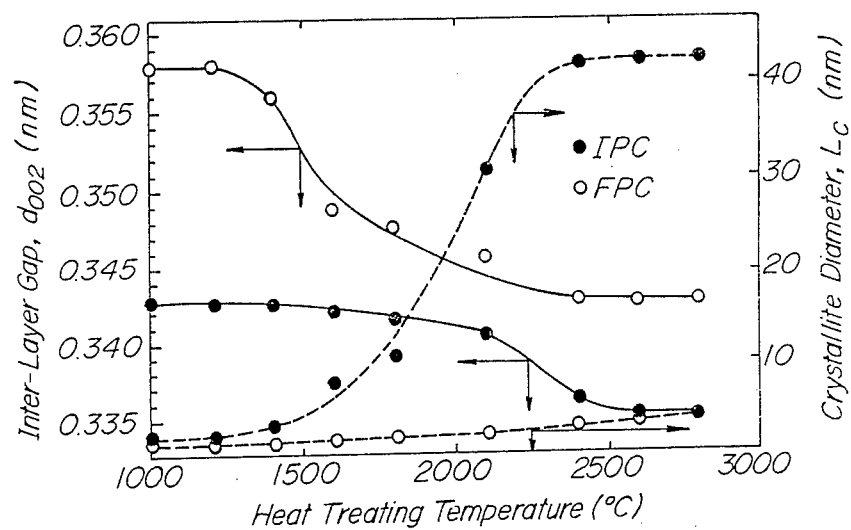
FIG_2

FIG_3A IPC28    FIG_3B IPC28
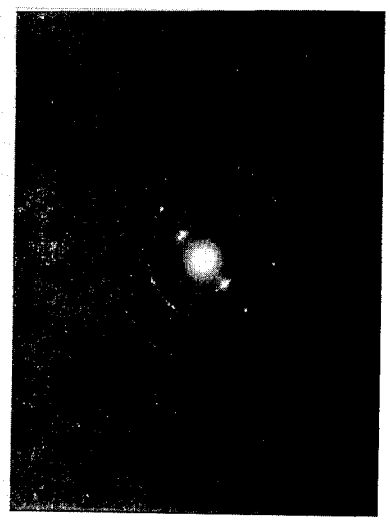
FIG_3C FPC28
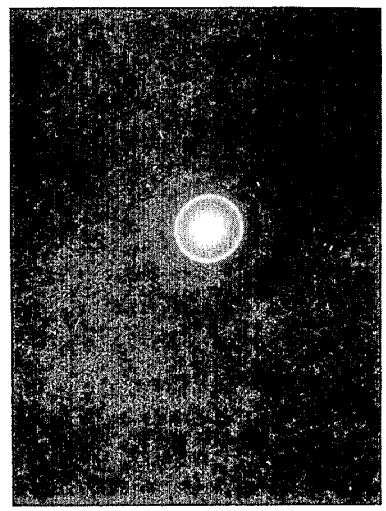

METHOD OF MAKING HIGH-ORIENTATION SHEET-LIKE GRAPHITE BY USING LAMINAR COMPOUND

BACKGROUND OF THE INVENTION

1. Field of the Invention

High-orientation graphite has an outstandingly high ability of reflecting radiation, and such graphite is used in medical low-energy neutron reflectors, neutron-ray monochromators, x-ray monochromators, and reflectors of nuclear fusion reactors.

This invention generally relates to a method of carbonizing high molecular compound, and more particularly the method of the invention is characterized in that high-orientation sheet-like graphite is made by preliminarily carbonizing a high molecular compound in a space between layers of laminar compound, the high molecular compound being one of various types, removing the carbonized compound from the space between the layers of laminar compound, and graphitizing the carbonized compound.

An object of the invention is to facilitate production of high-orientation sheet-like graphite by using a two-dimensional field for carbonization of high molecular compound, which compound can be one of various types.

2. Description of the Prior Art

High-orientation graphite has been produced in the form of Kish graphite, high-orientation pyrolytic graphite (HOPG), and the like. Kish graphite is produced by carbon precipitation from molten iron, and it provides graphite crystals of high quality. However, Kish graphite has a shortcoming in that its crystal is very small, and it is hard to apply to practical use. On the other hand, HOPG is produced by either compression of pyrolytic carbon or heating of pyrolytic carbon under stress at a high temperature above 3,200° C. Pyrolytic carbon can be obtained by gas-phase heat decomposition of hydrocarbon gas. However, HOPG has a shortcoming in that the amount of its production is limited and it is costly, because the assembling speed of pyrolytic carbon is very slow and heat treatment under stress at a very high temperature is required.

Since graphite is neither soluble nor fusible due to its extremely sturdy molecular structure, in order to obtain high-orientation graphite, a special synthesizing process is necessary for preparing graphite in the form of membranes or fibers with a highly orientated structure. It is noted, however, that those macromolecules, which can be carbonized without being melted or softened for maintaining its structure intact after the carbonization, have three-dimensional crosslinking of molecular chains developed therein during synthesis thereof, or that the three-dimensional crosslinking tends to be developed in such macromolecules during the heat treatment for graphitization. Thus, in order to produce high-orientation graphite from such macromolecules, there is a pressing need for research and development on a method of preparing macromolecules having such a high-orientation that can be kept intact during the ensuing graphitizing treatment.

SUMMARY OF THE INVENTION

Therefore, an object of the present invention is to solve the above-mentioned shortcomings of the prior art by providing a novel method of making high-orientation sheet-like graphite. According to the method of the invention, high-orientation sheet-like graphite is made by carbonization of high molecular compound; more particularly, high-orientation sheet-like graphite is made by polymerizing monomer of high molecular compound in a two-dimensionally restricted field, e.g., a space between layers of laminar compound, preliminarily carbonizing the thus polymerized polymer, removing the carbonized polymer from the space between said layers, and graphitizing the thus removed carbonized polymer.

In an embodiment of the method of making high-orientation sheet-like graphite by using laminar compound according to the invention, monomer of high molecular compound of gas phase or liquid phase is inserted into a space between layers of laminar compound such as laminar montmorillonite, and the monomer is polymerized by applying radiation ($\gamma$-ray) or adding polymerization starting agent, and the polymerized polymer is preliminarily carbonized by thermal decomposition, and the laminar compound such as montmorillonite is removed by acid treatment so as to expose the carbonized polymer formed in the space between the layers, and the exposed carbonized polymer is graphitized by heating at a high temperature.

Thus, the method of the invention is characterized in that monomer is polymerized and preliminarily carbonized in a space between layers of laminar compound such as montmorillonite, and the carbonized polymer is removed from the inter-layer space and graphitized at a high temperature so as to provide high-orientation sheet-like graphite.

It is known that, if monomer of high molecular compound is polymerized in a physically unrestricted free field allowing free movement of molecules, polymerization proceeds while causing three-dimensional twining of molecular chains, and macromolecules thus polymerized do not have any selective orientation. When the macromolecules thus polymerized are carbonized through solid phase, the molecular chains are carbonized in a state as twined in three-dimensional directions. Accordingly, it is difficult to make high-orientation graphite through graphitization of such carbonized polymer with three-dimensionally twined molecular chains.

In view of the above difficulty, the method of the invention uses a space between layers of laminar compound for carrying out both polymerization of monomer of high molecular compound and preliminary carbonization to fix the orientation of its structure such as aromatic structure. The gap or the thickness of space between layers of laminar compound is in the order of several Å, and if monomer of high molecular compound is inserted into such space and polymerized therein, macromolecules of monomolecular layer are produced. When the macromolecules thus produced are preliminarily carbonized in the space to form carbon precursor for graphite, the two-dimensional orientation of its structure such as aromatic structure is kept intact and fixed. Even after being removed from the space, the carbon precursor has a very high degree of orientation. The laminar compound such as montmorillonite can be removed, for instance, by treating it with hydrofluoric acid at 0° C.~20° C. for five minutes to one hour and refluxing with hydrochloric acid for two hours.

In view of the thermal stability of the laminar compound and the fact that the macromolecules in the inter-layer space become carbon precursor, the preliminary carbonization is preferably effected in an inert gas atmosphere for 0.5~24 hours at 500°~900° C. The graphitization is preferably effected as a high-temperature heat treatment of 1~60 minutes in an inert gas atmosphere at 2,500° C. or higher.

An example of the laminar compound is smectite group laminar compound. The reason for it is in that exchange cations exist between layers of laminar compound formed of smectite group clay mineral and the like, and monomer of high molecular compound inserted in the inter-layer space are coordinated with such exchange cations so as to be stabilized in the inter-layer space.

A preferred example of the monomer is polar compound such as acrylonitrile, because the insertion of polar compound into laminar compound is very easy as compared with insertion of other type monomers. As to the method for the insertion, gas-phase insertion is preferable from the standpoint of minimizing that monomer adsorption which occurs outside the inter-layer spaces, but liquid-phase insertion may be also used.

BRIEF DESCRIPTION OF THE DRAWING

For a better understanding of the invention, reference is made to the accompanying drawing, in which:

FIG. 1A is a scanning electron microscope picture showing carbon crystal structure of a specimen IPC of the invention prepared by using laminar compound;

FIG. 1B is a scanning electron microscope picture showing carbon crystal structure of a reference specimen FPC;

FIG. 2 is a graph showing the variation of average inter-layer spacing ($d_{002}$) and crystallite size ($L_c$) for different heat treating temperatures, for both the specimen IPC of the invention prepared by using laminar compound and the reference specimen FPC;

FIG. 3A is a selected area electron diffraction diagram of specimen IPC28 prepared by graphitizing the above specimen IPC of the invention at 2,800° C., the electron diffraction diagram being taken from a direction perpendicular to the specimen sheet;

FIG. 3B is a similar selected area electron diffraction diagram to that of FIG. 3A except that the diagram is taken from a bent portion of the specimen IPC 28 sheet; and FIG. 3C is a selected area electron diffraction diagram of reference specimen FPC28 prepared by graphitizing the above reference specimen FPC at 2,800° C.

DESCRIPTION OF THE PREFERRED EMBODIMENTS

The invention will be described in further detail now by referring to Examples.

EXAMPLE 1

A specimen IPC of the invention consisting of 5.5 g of carbon precursor was prepared by causing adsorption of 13.7 g of gas-phase acrylonitirle by 100 g of montmorillonite containing ion-exchanged Ca, effecting γ-ray polymerization (6 Mrad, 0.1 Mrad/h) so as to produce a montmorillonite-polyacrylonitrile complex, preliminary carbonizing thus formed polymer through thermal decomposition by heating at 700° C. for 3 hours, and removing the montmorillonite through acid treatment.

A reference specimen (FPC) was prepared by γ-ray polymerization of a N,N-dimethylformamide (DMF) solution of acrylonitrile, applying similar heat treatment to polyacrylonitrile thus formed.

FIG. 1A and FIG. 1B compare the crystal structures of the two specimens; namely, FIG. 1A shows the carbon crystal structure of the specimen IPC of the invention obtained from inter-layer space of montmorillonite, while FIG. 1B shows the carbon crystal structure of the reference specimen FPC.

FIG. 2 shows the graphitizing characteristics of the above specimens IPC and FPC, in terms of variations of their inter-layer spacing $d_{002}$ and crystallite size $L_c$ for different heat treating temperatures.

FIG. 3A, FIG. 3B and FIG. 3C compare the orientation of the above specimens after graphitization: namely, FIG. 3A and FIG. 3B show the orientations at different portions of a sheet-like graphite prepared by heat treating of the specimen IPC of the invention at 2,800° C., the specimen IPC being from inter-layer space of montmorillonite, while FIG. 3C show the orientation of graphite prepared by heat treating of the reference specimen FPC at 2,800° C.

Thus, it was proved that the method of the invention using the laminar compound is very effective in producing sheet-like graphite.

EXAMPLE 2

Liquid phase acrylonitrile was adsorbed by laminar compound consisting of bentonite, and polymerization was effected by using benzoyl peroxide as a initiator therefor. Carbon specimen similar to that of Example 1 was produced by applying the carbonizing treatment to the polymer thus produced in a manner similar to that of Example 1.

EXAMPLE 3

A specimen IPC of the invention and a reference specimen FPC were prepared by using vinyl acetate as monomer and applying similar treatment as that of Example 1. the specimens were graphitized. It was checked that the graphitizing characteristics of the thus prepared specimens were similar to that shown in FIG. 2.

As described in detail in the foregoing, the method of the invention facilitates production of high-orientation sheet-like graphite by preliminarily carbonizing macromolecules such as polyacrylonitrile molecules in a two-dimensional field such as a space between layers of laminar compound and graphitizing the preliminarily carbonized polymer. In general, the graphitization of macromolecules such as those of polyacrylonitrile has been difficult because carbonization therein proceeds through solid phase.

Thus, the invention contributes greatly to the industry by expanding the field of application of graphite as a high-function carbon material of next generation.

Although the invention has been described with a certain degree of particularity, it is understood that the present disclosure has been made only by way of example and that numerous changes in details may be resorted to without departing from the scope of the invention as hereinafter claimed.

What is claimed is:

1. A method of making high-orientation sheet-like graphite by inserting monomer of high molecular compound between layers of laminar compound, polymerizing the monomer, preliminarily carbonizing the thus formed polymer through thermal decomposition at 500°~900° C., removing the laminar compound through acid treatment so as to expose carbon formed between said layers, and graphitizing the thus exposed carbon at a temperature higher than 2,500° C.

2. A method as set forth in claim 1, wherein said laminar compound is montmorillonite.

3. A method as set forth in claim 1, wherein said acid treatment uses at least one acid selected from the group consisting of hydrofluoric acid, hydrochloric acid, nitric acid, and sulfuric acid.

4. A method as set forth in claim 1, wherein said acid treatment involves simultaneous use of at least two acids selected from the group consisting of hydrofluoric acid, hydrochloric acid, nitric acid, and sulfuric acid.

5. A method as set forth in claim 1, wherein said acid treatment involves use of at least two acids in succession which acids are selected from the group consisting of hydrofluoric acid, hydrochloric acid, nitric acid, and sulfuric acid.

6. A method as set forth in claim 1, wherein said laminar compound is of smectite group.

7. A method as set forth in claim 6, wherein said laminar compound is clay mineral.

8. A method as set forth in claim 1, wherein said monomer is polar monomer selected from the group consisting of acrylonitrile, vinyl acetate, and vinyl chloride.

* * * * *